United States Patent [19]

Carlson

[11] Patent Number: 4,508,948

[45] Date of Patent: Apr. 2, 1985

[54] MICROWAVE COOKING METHOD

[75] Inventor: Roger W. Carlson, Cedar Rapids, Iowa

[73] Assignee: Amana Refrigeration, Inc., Amana, Iowa

[21] Appl. No.: 571,159

[22] Filed: Jan. 16, 1984

[51] Int. Cl.³ .................................................. H05B 6/68
[52] U.S. Cl. ..................... 219/10.55 M; 219/10.55 B; 426/243; 99/325
[58] Field of Search ................. 219/10.55 B, 10.55 M, 219/10.55 E, 10.55 R; 426/241, 243, 524; 99/325, DIG. 14

[56] References Cited

U.S. PATENT DOCUMENTS

| | | | |
|---|---|---|---|
| 3,259,056 | 7/1966 | King | 99/325 |
| 3,813,918 | 6/1974 | Moe | 219/10.55 R |
| 3,932,723 | 1/1976 | Tamano et al. | 219/10.55 B |
| 4,009,359 | 2/1977 | Tallmadge | 219/10.55 B |
| 4,255,639 | 3/1981 | Kawabata | 219/10.55 B |
| 4,299,115 | 11/1981 | Athey et al. | 219/10.55 R |
| 4,317,977 | 3/1982 | Buck | 219/10.55 B |
| 4,328,408 | 5/1982 | Lawson | 219/10.55 B |
| 4,390,768 | 6/1983 | Teich et al. | 219/10.55 B |
| 4,396,817 | 8/1983 | Eck et al. | 219/10.55 M |

Primary Examiner—Philip H. Leung
Attorney, Agent, or Firm—William R. Clark; Joseph D. Pannone

[57] ABSTRACT

A method for controlling a microwave oven with a microcomputer wherein a first time period corresponding to the time required to raise the temperature of a weighed food body from refrigerator temperature to room temperature and a second time period corresponding to the time required to cook the food body from an initial room temperature are calculated and stored. The microcomputer then sequentially controls the magnetron through cycles in accordance with the first and second time periods, respectively. Rather than being erased after completion of the first cycle, the first time period remains stored in the microcomputer and can be activated by the operator to provide a small incremental amount of heat to the food body after it has been cooked. Also, the operator can adjust the number of heat units per weight units used in the calculation of the cooking cycle so as to provide a food body that is cooked less or more than medium doneness.

8 Claims, 17 Drawing Figures

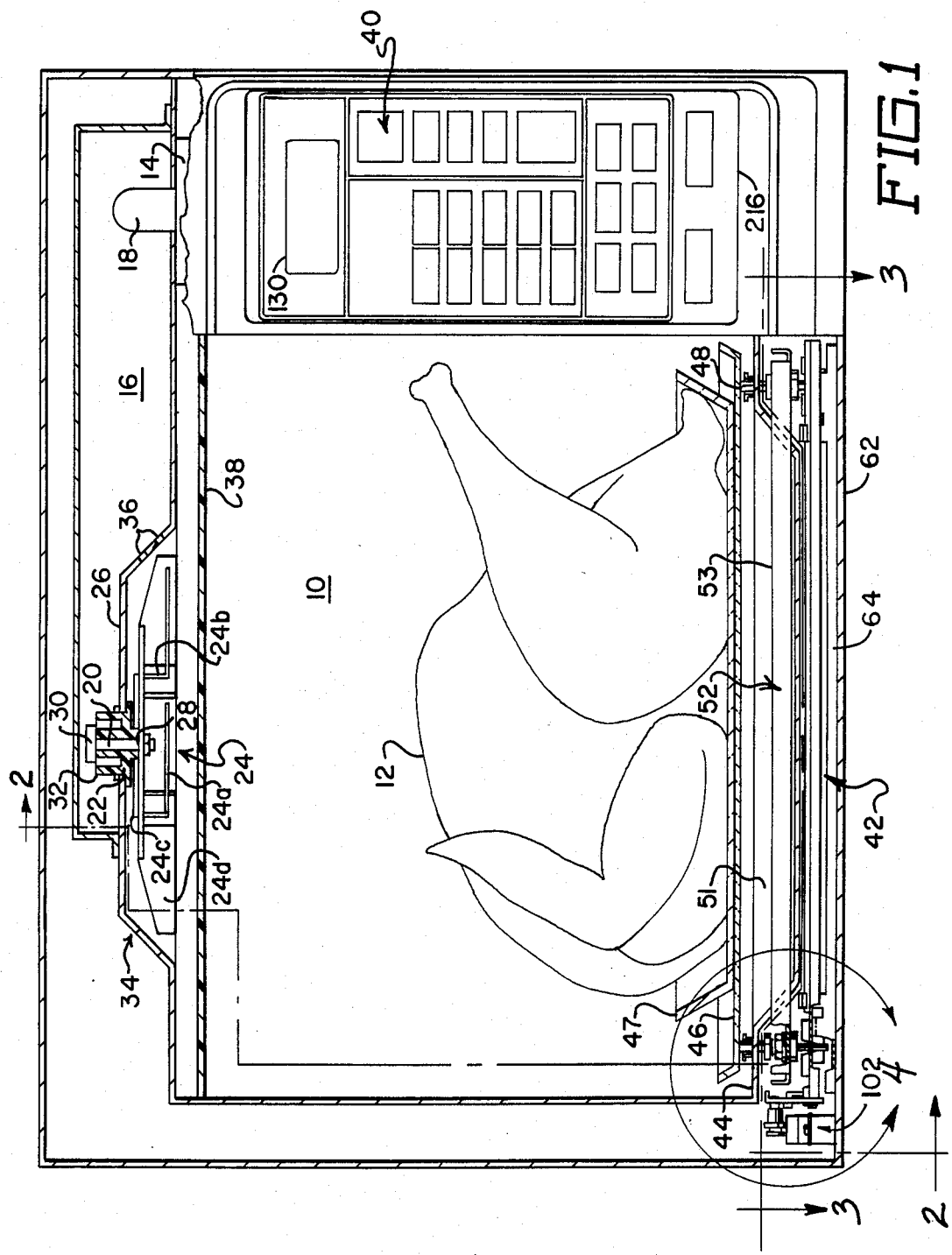

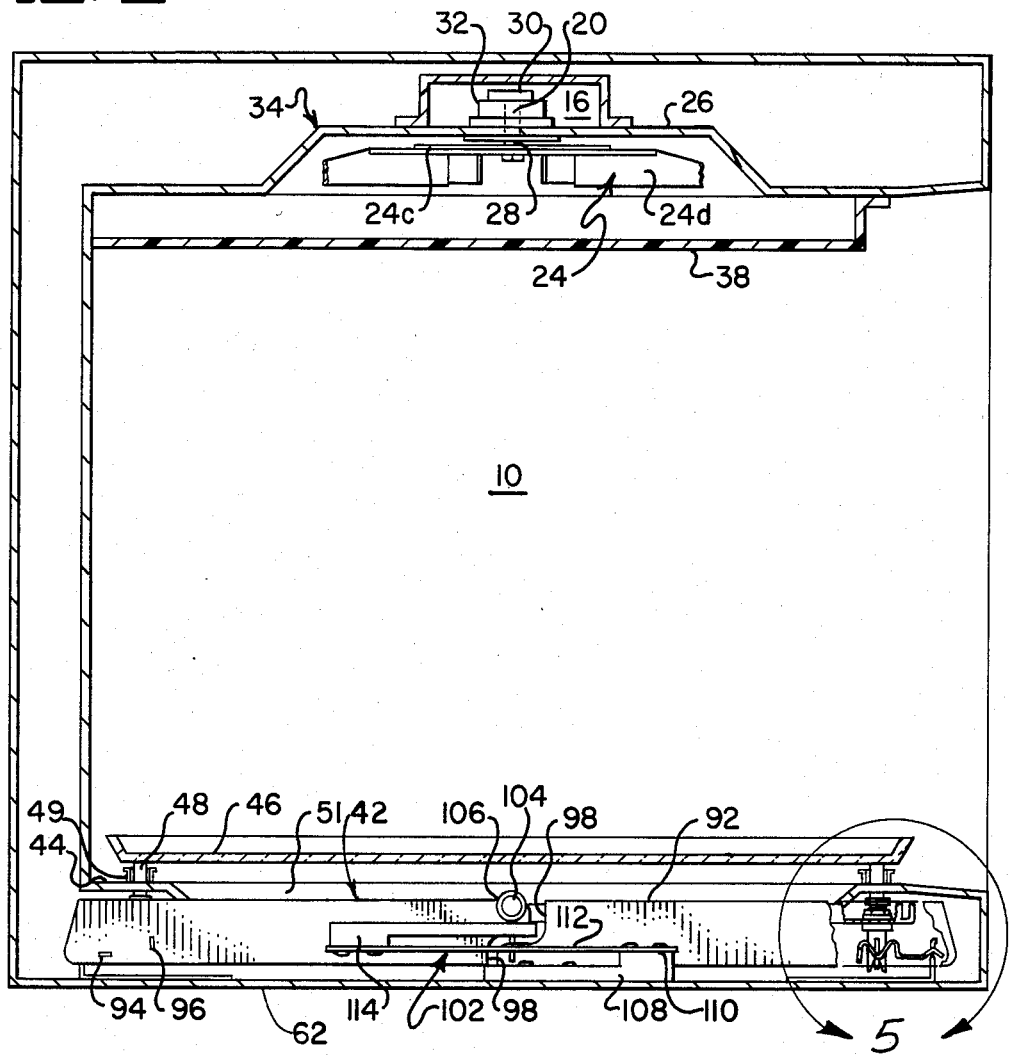
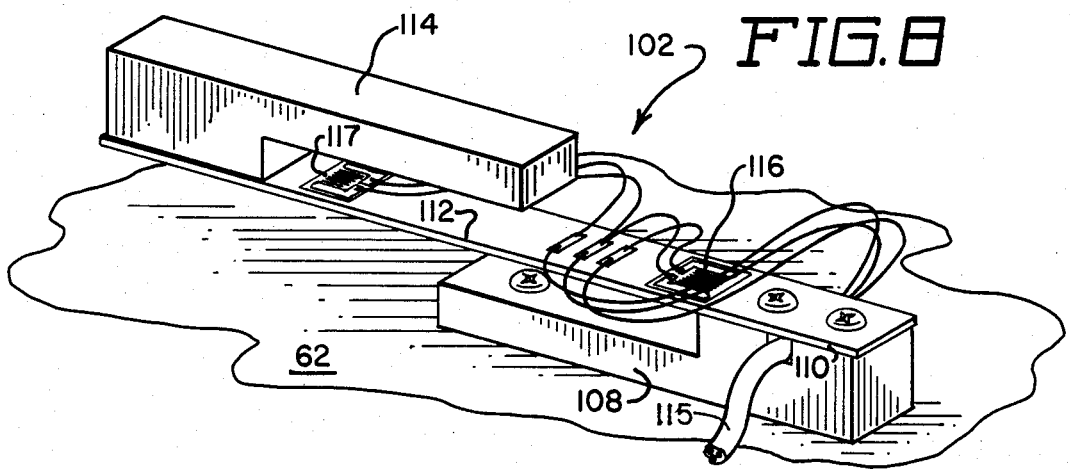

MICROWAVE COOKING METHOD

BACKGROUND OF THE INVENTION

The process of cooking in a conventional gas or electric oven is relatively uncomplicated. Generally, temperature and time are the only two cooking parameters considered. Normally, the oven is preheated to a given temperature and the food is placed in the oven for a specified time period which is sometimes determined by the weight of the food. For example, it may be preferable to cook a turkey at 350° F. for 20 minutes per pound. Generally, the heat at the surface of the food gradually travels inward by conduction raising the temperature of the interior and causing physical changes which are part of the cooking process. Because this cooking process is relatively slow and is always limited by the temperature of the oven so that there can be no thermal runaway, there is a reasonable tolerance in the selection of the cooking parameters. For example, a deviation of 10 minutes per hour or 25° F. in temperature may not have a significant impact on the palatability of the cooked food. This tolerance has contributed to a general confidence of most cooks in their ability to accurately select temperature and time, even in new cooking situations. Another contributing factor is exposure in that most cooks grew up in homes where all of the cooking was done in conventional gas or electric ovens.

The microwave oven has evolved in the last two or three decades. Although consumer acceptance has greatly increased as has the percentage of households with microwave ovens, some consumers are still reluctant to buy or use microwave ovens because they don't have the general confidence in their ability to operate them; they feel intimidated by the sometimes complicated directions for using them. They no longer have the comfortable parameters of temperature and time to select. The introduction or indoctrination into a relatively new cooking process is complicated by the rate at which foods cook. More specifically, because a microwave oven cooks so fast, an error of a few minutes in the selected cooking time can be a substantial percentage of the required cooking time and can result in a substantial difference in the doneness of the food. Accordingly, a technique that has been adopted by many if not most microwave cooks is to set the microwave cooking time for less than what they expect it to be and then, after completion of the cycle, to add small amounts of additional heat in sequential cycles until the food arrives at the right state.

Various techniques have been employed to provide the user with simplified operation that gets the food to the right doneness. One such example is described in U.S. Pat. No. 4,390,768, issued June 28, 1983, wherein there is described a scale coupled to the cavity. The weight of the food as positioned in the cavity is coupled directly to a microprocessor along with the food category and the cooking time is automatically calculated and controlled. Another approach is described in U.S. Pat. No. 4,317,977, issued March 2, 1982, wherein controls are provided for selecting between rare and well-done; the controls alter the desired final temperature which is used to determine when the cooking process terminates. Both of these techniques, however, have drawbacks. More specifically, if the operator controls the oven according to the simplified methods described therein and the food is not done to the desired state, there are no provisions for altering the process.

SUMMARY OF THE INVENTION

The invention defines the method of using a microcomputer in a microcomputer-controlled microwave oven with a scale-coupled cavity to control the microwave oven comprising the steps of providing a first signal from the scale to the microcomputer wherein the first signal corresponds to the weight W of a food body positioned in the cavity, inputting a second signal to the microcomputer wherein the second signal specifies the food category of the food body as selected by the operator, calculating a first time period in response to the first signal, the first time period defining the time of microwave radiation to raise the temperature of the food body from an initial state of approximately refrigerator temperature to a final state of approximately room temperature, calculating a second time period in response to the first and second signals, the second time period defining the time of microwave radiation to cook the food body from an initial state of approximately room temperature, controlling the microwave oven through sequential steps of microwave radiation in accordance with the first and second time periods respectively, and controlling the microwave oven through a sequential step of microwave radiation in accordance with the first time period for a second occurrence, the second occurrence following the step of the second time period and being in response to an operator actuated input. The term "microcomputer" is meant to define any controller processor such as a microprocessor. It may be preferable that the refrigerator temperature be approximately 40° F. and the room temperature be approximately 65° F. Also, the first time period may be calculated by the equation $$T_1 = 25(W+0.1)RP$$

where R compensates for the oven output power being less than maximum and P compensates for the maximum output power of the oven being different than a predetermined standard output power.

The invention may also be practiced by the method of using a microcomputer to control the microwave oven comprising the sequential steps of positioning a food body in the cavity of the oven, storing the weight W of the food body in the microcomputer, said food weight W being derived from a weighing of the scale that is coupled to the microcomputer, storing a food category in the microcomputer, calculating in the microcomputer a first time period corresponding to the microwave radiation time required to raise the temperature of the food body from a refrigerator temperature to room temperature, the first time period being calculated as a function of the food weight, calculating in the microcomputer a second time period corresponding to the microwave radiation time required to cook the food body from an initial state of room temperature, the second time period being calculated as a function of the food weight W and the food category, and controlling the microwave radiation of the microwave oven through three sequential steps, the first step being equal to the first time period, the second step being equal to the second time period, and the third step being in response to an operator actuated control and being equal to the first time period.

The invention may also be practiced by the method of inputting a first signal to the microcomputer wherein the first signal corresponds to the weight W of a food body positioned in the cavity, inputting a second signal to the microcomputer, the second signal specifying the food category of the food body as selected by the operator, inputting a third signal to the microcomputer, the third signal defining the degree of desired doneness of the food body as selected by the operator, defining a value $\beta$ in response to the second and third signals, the value $\beta$ being expressed in terms of heat units per weight units of food, calculating a time period for cooking the food to the state of desired doneness from an initial state of approximately room temperature, the calculation including at least one term including $\beta$ and W as factors, and controlling the microwave oven in accordance with the calculated time period.

BRIEF DESCRIPTION OF THE DRAWINGS

The foregoing summary of the invention will be more fully understood by reading the description of the preferred embodiment with reference to the drawings wherein:

FIG. 1 is a front elevational partially broken-away view of a microwave oven without showing electrical connections to the scale;

FIG. 2 is a view taken along line 2—2 of FIG. 1;

FIG. 8 is a perspective view of the compliant member showing electrical connections;

DESCRIPTION OF THE PREFERRED EMBODIMENT

Figure 3:
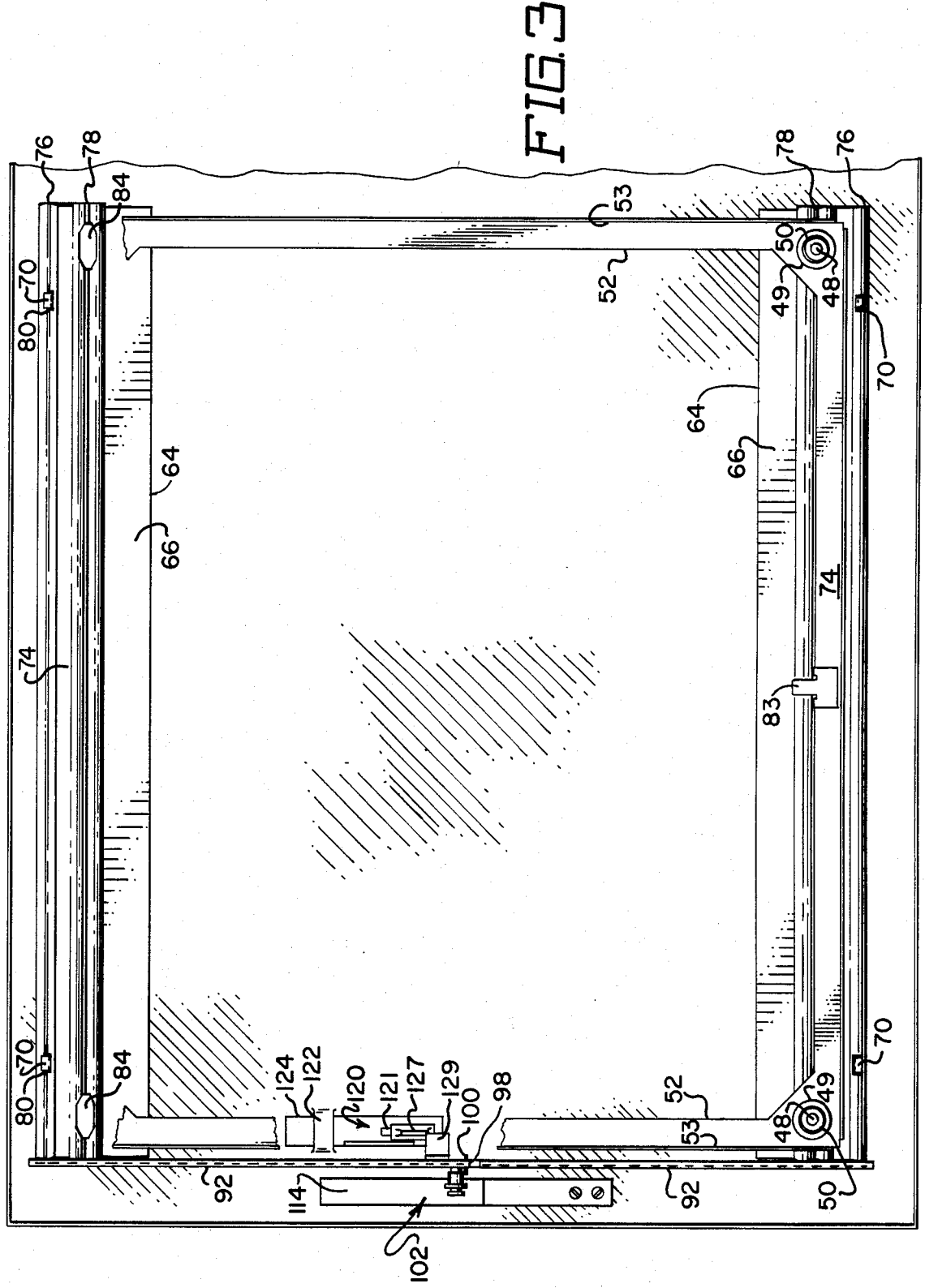
FIG. 3 is a view taken along line 3—3 of FIG. 1.
Figure 4:
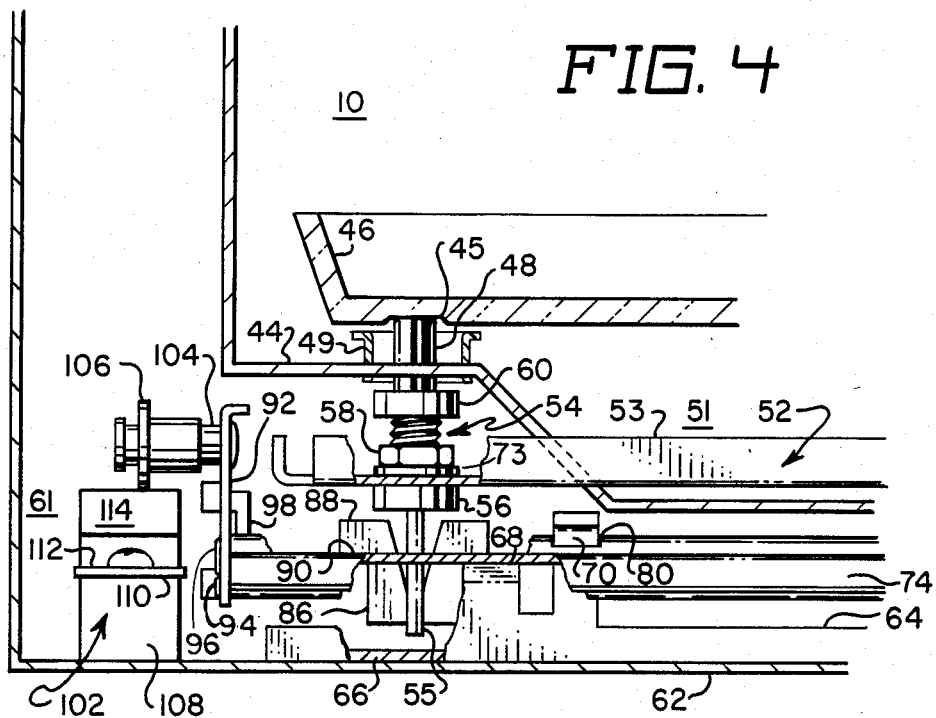
FIG. 4 is an expanded view taken from FIG. 1 as indicated.
Figure 5:
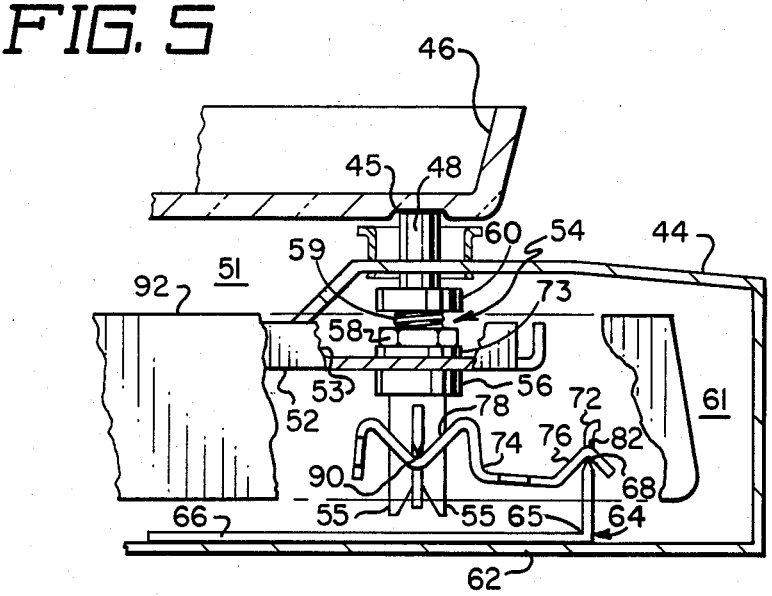
FIG. 5 is an expanded view taken from FIG. 2 as indicated.

Referring to FIG. 1, there is shown a partially cut away microwave oven having a heating cavity 10 containing a food body 12. Access to cavity 10 is through the opening of a door (not shown). Many conventional parts such as, for example, the door seal structure, are not shown because they are well known and form no part of the invention. Microwave energy is generated by a magnetron 14 and coupled to waveguide 16 by the output probe 18 of the magnetron. It may be preferable that magnetron 14 provide microwave energy at a frequency of 2450 megahertz. The microwave energy in waveguide 16 excites antenna probe 20 and is coupled through an opening 22 in the waveguide to primary radiator 24. More specifically, primary radiator 24 may preferably consist of a two-by-two array of antenna elements 24a where each element is an end driven half wavelength resonating antenna element supported by a length of conductor 24b perpendicular to the elements 24a and the upper wall 26 of the microwave oven cavity 10. Parallel plate microstrip transmission lines 24c connect each of the support conductors 24b to a center junction 28 axial to rotation. At the junction 28, the antenna probe 20 is attached to the primary radiator 24. Antenna probe 20, which has a capacitive hat 30 is supported by a plastic bushing 32 positioned in the waveguide. The bushing 32 permits rotation of the antenna probe 20 and the primary radiator 24 around the axis of the antenna probe 20. The upper wall 26 of cavity 10 is shaped to form a dome 34 having a truncated conical shape extending outwardly in the wall 26 to provide a substantially circular recess partially surrounding the directive rotating radiator 24 and provides uniform energy distribution in the product being heated. The air from a blower (not shown) which is used to cool the magnetron 14 may be circulated through the cavity 10 to remove moisture and other vapors. Furthermore, this air may pass through waveguide 16 and be directed into the cavity 10 through apertures 36 in the dome 34 to provide a stream of air which impinges on fins 24d supporting the primary radiator 24 so as to impart rotation of the primary radiator 24. This rotation further enhances the power distribution and hence heating uniformity within the cavity 10. The fins 24d may generally be fabricated of a plastic microwave transparent material so as not to absorb microwave energy. In an alternate embodiment, an electric motor (not shown) could be used to provide rotation of the radiator 24 in lieu of the air driven method described above. Grease shield 38 is made of a microwave transparent material and, in addition to directing circulation air in the cavity 10, it prevents splatter from reaching the primary radiator 24 and the dome 34. Control panel 40 which is shown in detail in FIG. 11, consists of keyboard 216 through which the operator inputs control data to control microcomputer 170 and display 130 by which microcomputer 170 indicates status information to the operator. An alternate function of keyboard 216 will be described later herein. A variety of conventional keyboard switches and displays could be used.

Still referring to FIG. 1 and also to FIGS. 2–5, a scale 42 which is positioned below the floor 44 of the cavity 10 is shown. The scale 42 is mechanically coupled to tray 46 in the cavity by four microwave transparent posts 48 that extend through circular holes 50 respectively positioned near the four corners of the cavity floor 44. Tray 46 may typically rest approximately one inch above the floor 44 of the cavity 10 in the regions of the corners and be spaced a greater distance near the center of the cavity where the cavity floor 44 defines recess 51. The tray is fabricated of a microwave transparent material such as Pyrex glass and may preferably have bottom indentations 45 into which posts 48 insert providing alignment in the horizontal plane. Preferably, the tray 46 may easily be lifted off so that it can be removed from the cavity for cleaning. Because the floor 44 of the cavity 10 is recessed in the center, microwaves can readily enter the lower central region of the cavity below the tray 46 and then enter the food body 12 from the underside. The weight of tray 46 and any mass positioned thereon is supported by posts 48 and therefore is coupled to scale 42.

As described in detail in U.S. Pat. No. 4,390,768, issued June 28, 1983, which is hereby incorporated by reference, the use of a microwave transparent material for posts 48 and the holes 50 being less than one-half wavelength in circumference suppresses leakage of microwave energy through the holes. Also, holes 50 are lined with cylinders 49 or eyelets which are connected perpendicularly to floor 44 and which function to further suppress microwave leakage through holes 50.

Figure 6:
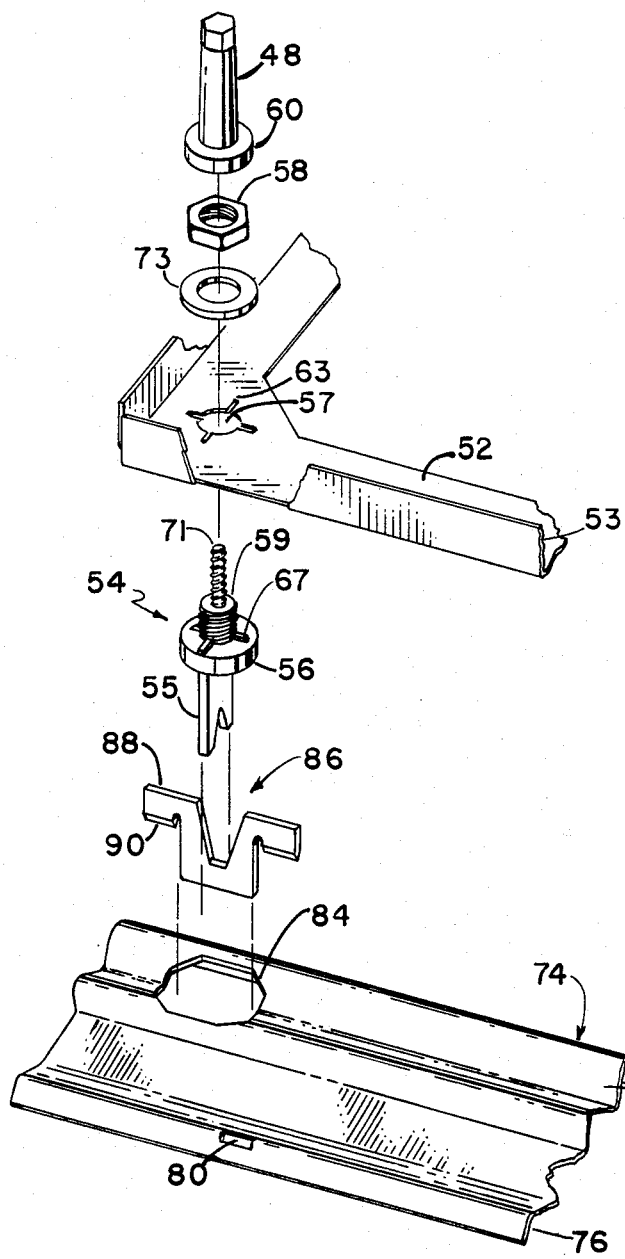
FIG. 6 is an exploded view of a support stud and associated parts.

Still referring to FIGS. 1-5, a rectangular frame 52 is positioned under the cavity floor 44 around the periphery defined by recess 51 in the floor 44. The edges 53 of frame 52 may preferably be bent perpendicular to make the structure more rigid. The function of frame 52 is to mount microwave transparent posts 48 parallel to each other as part of a rigid structure so that they respectively align with the four holes 50 through which they insert into cavity 10. The described structure also helps to prevent damage or misalignment during shippage of the microwave oven. As shown best in the exploded perspective view of FIG. 6, support studs 54 are connected near the four corners of frame 52. Each stud 54 has two bottom legs 55 and a collar 56. Each stud is inserted through an aperture 57 near a corner of frame 52 until the collar 56 seats against the under surface of the frame and then the stud 54 is secured in place by tightening down a lock nut 58 over washer 73 onto threads on the throat or body 59 of the stud. Indexing lugs 67 on the upper surface of collar 56 engage with indexing slots 63 in aperture 57 to prevent rotation with respect to the two. Each stud 54 has a circular threaded top end or head 71 onto which a thread bore in the bottom end of each microwave transparent post 48 is screwed. The height of each post 48 in cavity 10 can be raised or lowered by turning the post to screw the post up or down on its respective stud; accordingly, the tray may be made to rest evenly on all four posts 48 even though the support areas of the tray 46 may not define a perfect plane. In other words, regardless of the production tolerances of the tray 46 and how it may warp, the tray may be made to rest securely on the four posts without wobbling by altering the height of one or more of the support posts 48. Each post 48 may preferably have a flange 60 which provides structural strength and also serves to plug hole 50 thereby limiting view from the cavity into chamber 61. It may be preferable that flange 60 have a smaller diameter than hole 50 so that a post 48 may be replaced from cavity 10.

Scale 42 is positioned in a horizontal plane beneath the floor 44 of cavity 10 in a chamber 61 between the floor 44 of the cavity 10 and the bottom of the outer chassis 62 of the oven. Like frame 52, the components of scale 42 are mounted in the peripheral region of chamber 61 around recess 51 where the height is greater. The base of scale 42 defines two elongated support brackets 64 each having a lengthwise right angle bend 65 to form a side 66 that is connected to the bottom of the outer chassis 62 by suitable means, such as, for example, spot welds or screws. The brackets 64 are parallel to each other and each has knife edge blade 68 protruding upwardly near each end. These blades 68 serve as fulcrums for scale 42. As an example, blade 68 may be approximatley one inch long. Near the ends of each bracket 64, a prong 70 extends upwardly to an outward right angle bend 72.

The outer sides of parallel lever rails 74 are respectively supported by blades 68. More specifically, rails 74 are stamped from sheet metal and define an outer inverted V-shaped trough 76 and an inner channel 78 both of which run the length of the rail. The rails have slots 80 in the V-shaped trough 76 which align with prongs 70. In fabrication, each rail is rotated approximately 90° about its lengthwise axis and, after inserting slots 80 over prongs 70, the top of the rail is rotated inwardly and down to position each rail as shown in FIGS. 1-5 wherein the vertex 82 of the V-shaped trough 76 is supported by the knife edge blades 68 near the ends of the rails 74. The prongs 70 accordingly function to keep the rails 74 supported on the knife edge blades 68 during movement of the oven such as during shipping. The inner channel 78 is spaced some distance such as, for example, an inch or two, inwardly from the knife edge blade 68 as shown best in FIG. 5 and supports the studs 54. More specifically, at locations near the ends of rails 74 and aligning with the studs 54 as connected to frame 52, slots 84 are provided in the bottom of channels 78 and small V-shaped pivot members 86 or support elements of the scale are inserted down into slots 84. The pivot members 86 have protruding fingers 88 that rest on the bottom of the channels 78. The bottom sides of the fingers 88 each have a knife edge 90 as does the inside vertex of the V. Studs 54 rest on pivot members 86 by legs 55 of the studs 54 straddling the knife edge of the inside vertex of the V and accordingly, very little friction is created. Friction would interfere with the transfer of weight from studs 54 to lever rails 74 and the free rotation of the lever rails about the blades 68. The indexing slots 63 and lugs 67 insure that legs 55 align perpendicularly with pivot members 86 which are aligned vertically because the center of gravity is below the slot 84 through which the vertex of the V inserts. With the structure so described, weight from any one of the four posts 48 causes a downward force that tends to rotate its supporting lever rail 74 about its fulcrum or blade 68. The forces at the two ends of an individual rail 74 are additive such that regardless of the lateral position of a food body 12 in the cavity, the rotating force or torque on a rail 74 is the same.

Figure 7:
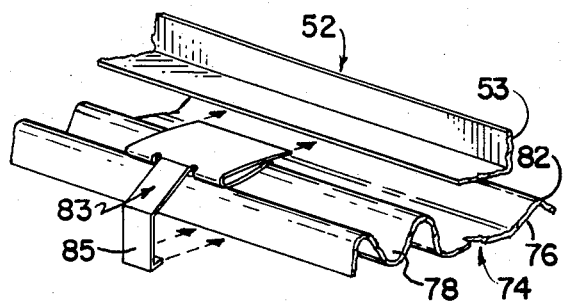
FIG. 7 is a perspective view of a clip secured to the frame.

Referring to FIG. 7, a clip 83 is slid into engagement with frame 52. Clip 83 has a curved finger 85 which hooks under rail 74 to couple the frame 52 to the rail 74. If the legs 55 of studs 54 were to become disengaged from their supporting pivot members during shipment, time consuming service would be required.

An extender lever arm 92 is connected to one of the ends of each of the lever rails 74. The connection may preferably be made by inserting a horizontal tab 94 and a vertical tab 96 on the ends of the rails through aligned slots in the extender lever arms and then staking tabs 94 and 96. The lever arms 92 are substantially positioned end to end and may be overlapping as shown best in FIG. 3. The adjacent ends 98 of the extender lever arms 92 are joined together by a fastener 100 as shown best in FIG. 10. Fastener 100 permits vertical motion of the arms 92 at the joint so that they can pivot about blades 68. For example, fastener 100 may be a U-shaped pin extending between the extender lever arms 92 and inserted through circular apertures therein.

A compliant member 102 which is shown in detail in FIG. 8 resists the downward movement of the ends 98 of lever arms 92 as they and lever rails 74 would tend to rotate about the fulcrum of blades 68 resulting from a downward force by posts 48. More specifically, a rod 104 is rigidly attached perpendicularly to one of the lever arms 92 near its fastener 100 joint. The rod 104 has a disk 106 on the end which rests on top of compliant member 102 as shown in FIG. 2. Compliant member 102 defines a block 108 with a platform 110 having a beam 112 extending cantilevered therefrom. The block, which may be aluminum, may preferably be screwed to the floor of the outer chassis 62 and the beam 112 may be screwed to the platform 110 of the block 108. At the opposite end of the cantilever, an L-shaped block 114 is connected to the top of the beam 112 as shown in FIGS. 2 and 8. The beam 112 may be flexible aluminum. The disk 106 of rod 104 rests on the upper surface of the L-shaped block 114 and exerts a downward force on compliant member 102. Accordingly, the compliant member generally defines an S-shaped structure with the bottom attached to the outer chassis 62, the exerting force being applied to the top, and the middle cross member being flexible to bend as the force is exerted. As the force is exerted and the flexible beam 112 bends, a portion of its upper surface near the cantilever is strained in tension and a portion of its upper surface near the opposite end is strained in compression. Accordingly, strain gauges 116 and 117 which are placed on the top of beam 112 near these two positions are respectively subject to tension and compression strains. Wire 115 is shown interconnecting strain gauges 116 and 117; the rest of the circuit which provides a weight corresponding signal to microcomputer 170 will be described in detail later herein with reference to FIG. 16. In general, strain gauges 116 and 117 would be covered with a hermetically sealing substance.

Figure 9:
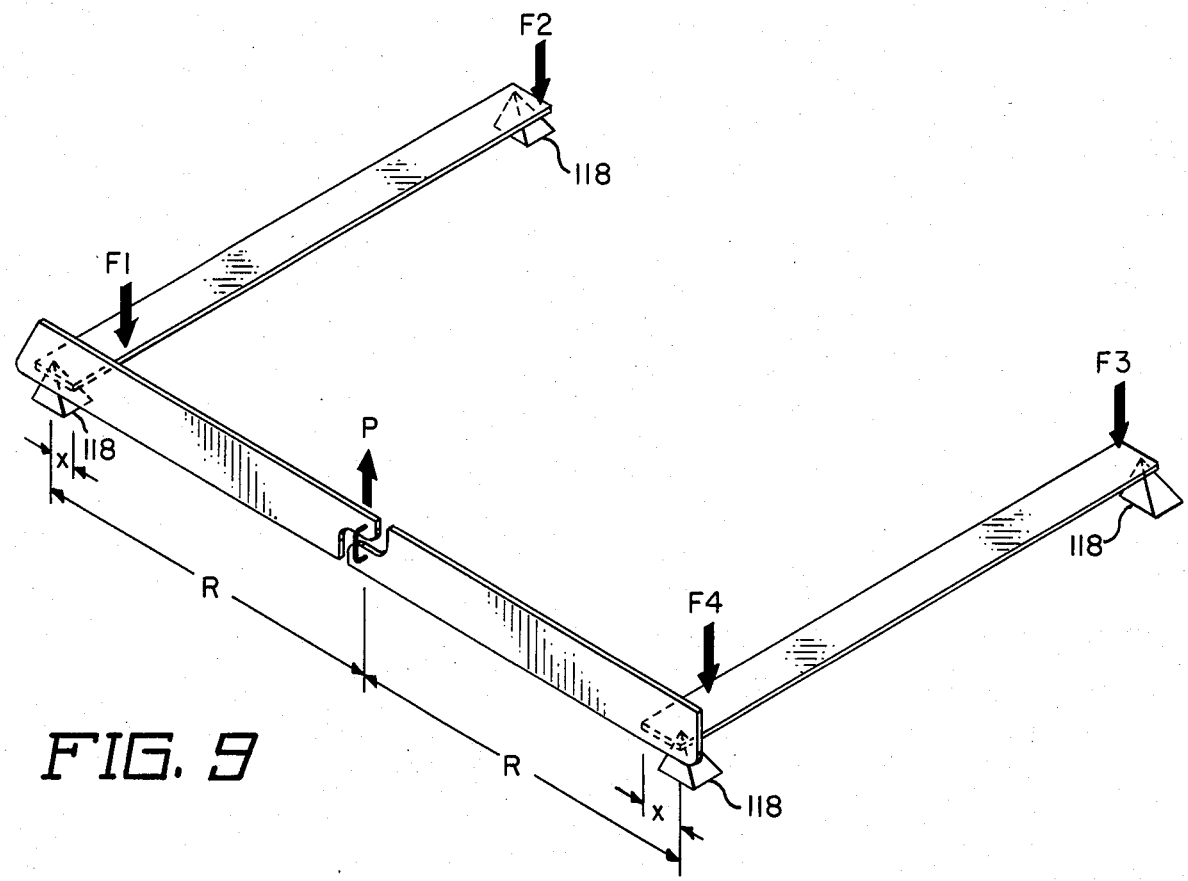
FIG. 9 is an illustrative diagram of the scale forces.

Referring to FIG. 9, a diagrammatical perspective view of scale 42 is shown. Forces F1, F2, F3 and F4 respectively correspond to weight exerted by the four posts 48. Fulcrums 118 correspond to knife edge blades 68. P corresponds to the force that compliant member 102 must exert upward for a balance of forces. The static condition is defined by the equation:

$$P = (X/R)(F1 + F2 + F3 + F4)$$

where X is the distance from F1, F2, F3 or F4 to the closest fulcrum 118 and R is the distance from P to a fulcrum 118. The structure is such that regardless of the position of a food body 12 in the oven cavity, the strain that it puts on compliant member 102 will be substantially the same because F1–F4 are additive. Distance R which corresponds to the distance along extension lever arm 92 from rod 104 to blades 68 may preferably be approximately 7 inches. Distance X which corresponds to the distance between a post 48 and blade 68 may preferably be 0.8 inches. Accordingly, for these illustrative examples, $X/R = 1/8.75$. As an example, if a weight of 15 pounds were positioned on the tray 46, a downward force of 1.7 pounds would be exerted on the compliant member 102 by rod 104. This 1.7 pounds would cause a deflection of beam 112 resulting in tension strain in the region adjacent to platform 110 and compression strain in the region adjacent to L-shaped block 114. As is well known, the electrical resistance of a strain gauge 116 and 117 bonded to these strain regions varies according to the deformation which is somewhat linear with the weight resting on tray 46.

Figure 10:
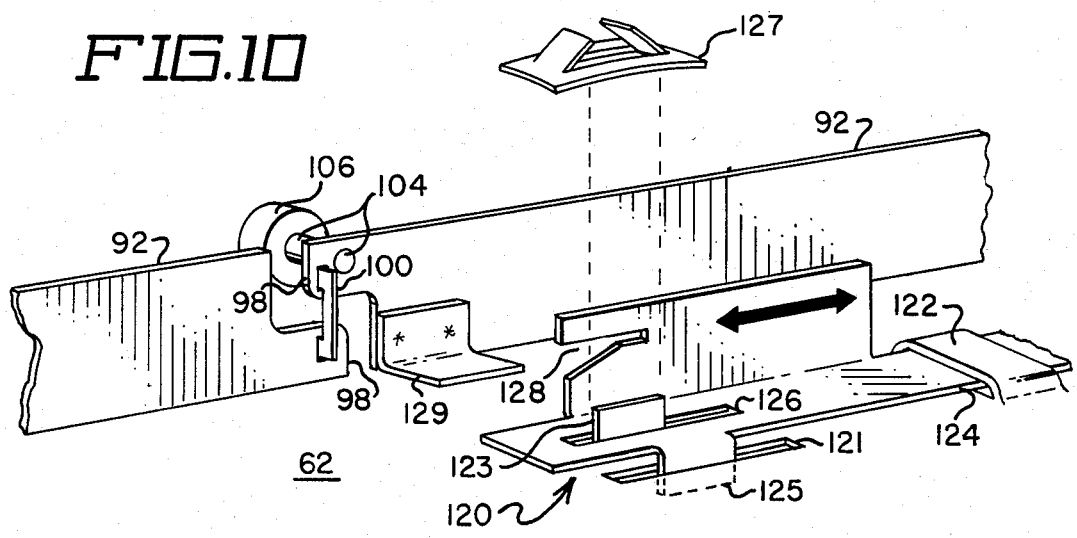
FIG. 10 is a perspective view of the scale locking mechanism.

Referring to FIG. 10, a perspective view of scale locking mechanism 120 or latch is shown. Apparatus such as clips 83 and prongs 70 have been described heretofore with regard to the object of preventing damage or misalignment during shipping. Scale locking mechanism 120 also functions toward this objective. More specifically, a slot 121 and guide 122 are formed in the bottom of outer chassis 62 adjacent to the inward ends 98 of extender lever arms 92. Also, a tab 123 is bent upwardly from the outer chassis 62. Scale locking mechanism 120 has a neck 124 which inserts through guide 122, a tab 125 which inserts through slot 121, and a slot 126 through which tab 123 is inserted. Then, retaining clip 127 is pressed down over tab 123 to secure scale locking mechanism 120 in a horizontally slidable position. Scale locking mechanism 120 is shown in a scale operational position wherein it provides no constraint to the vertical movement of extender lever arms 92. In readying the scale 42 for movement such as shipping, scale locking mechanism 120 is slid horizontally until notch 128 engages locking tab 129 mounted to one of the extender lever arms 92. In this locked position, vertical movement of arms 92 is prevented and this rigidly secures scale 42 for shipment. Tab 129 also functions as a stop to prevent damage to compliant member 102 as a result of being pressed down too far. Sliding of locking mechanism 120 is effected by pushing on tab 125 from the underside of outer chassis 62.

Figure 11:
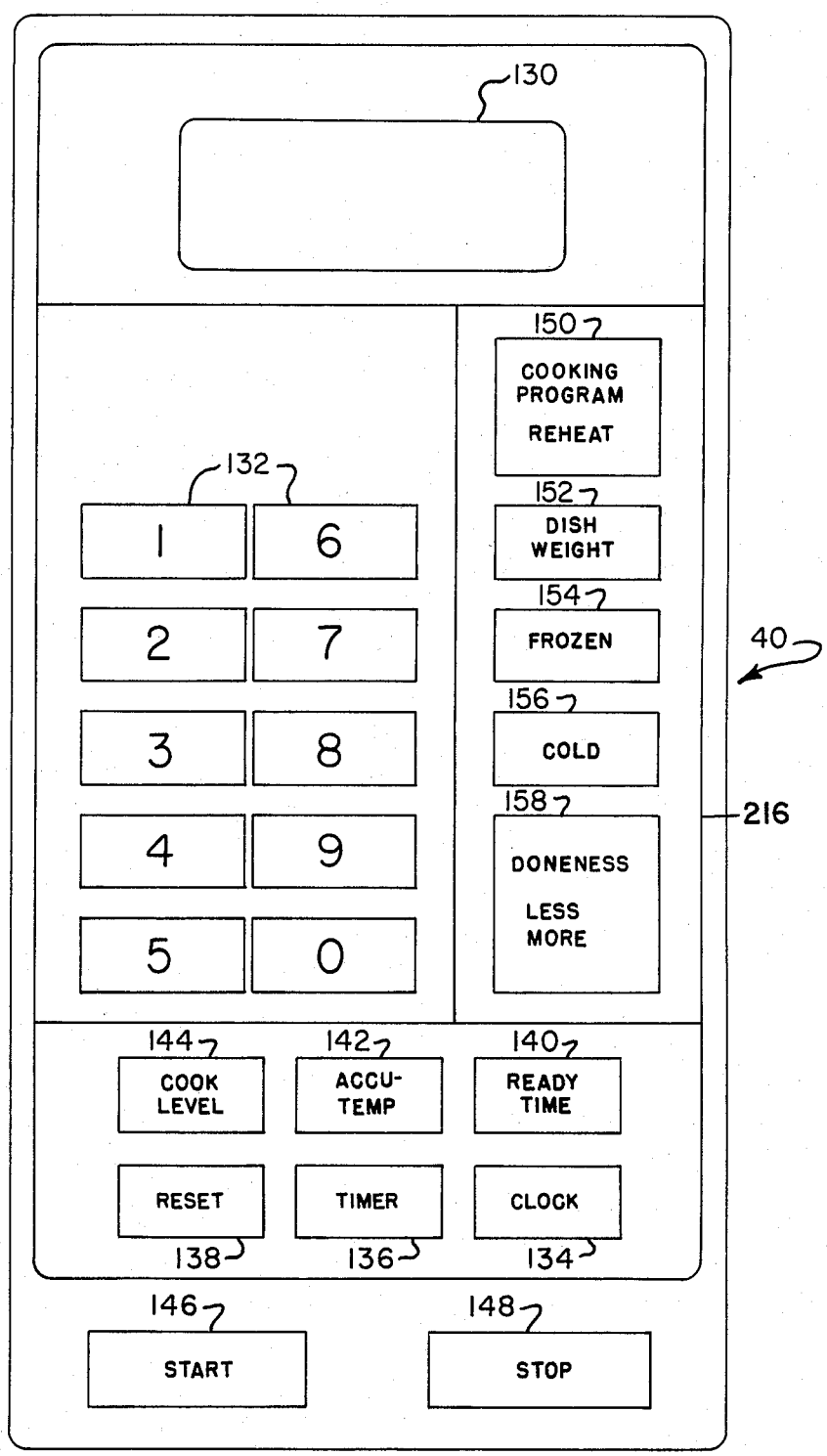
FIG. 11 is a front elevational view of the control panel of FIG. 1.

Referring to FIG. 11, there is shown an expanded view of control panel 40 of FIG. 1. Control panel 40 generally includes a display 130 for status and a keyboard 216 for input. The input controls of keyboard 216 consist of touch pad switches numerically labelled 0–9, COOKING PROGRAM/RESET, DISH WEIGHT, FROZEN, COLD, DONENESS, COOK LEVEL, ACCU-TEMP, READY TIME, RESET, TIMER, CLOCK, START, AND STOP. Preferably, these keyboard entries may be provided by conventional capacitive touch pad or membrane switches. Typically, a touch panel interface may be connected between the keyboard and the microcomputer 170; the interface is of conventional design and is included in many commercially available microwave oven models. Similarly, a high voltage driver interface may be connected between microcomputer 170 and the display 130 of control panel 40 to provide lighted indicators. Display 130 includes a digital read-out and status words that are selectively illuminated.

Later herein with reference to FIGS. 12a and 12b, the functions and operations of some of the touch pad switches will be described in detail. However, a summary of control panel 40 in an operational mode will be provided here. Later, a mode for calibrating or altering computational constants will be described. In operation, numerical or DIGIT pads 132 may generally be used conventionally to enter data for well-known functions. For example, when the microwave oven is not being used, display 130 indicates the time of day. To change the time of day, the operator pushes DIGIT pads 132 corresponding to the desired time; this time is displayed in display 130. Then, when the operator pushes CLOCK pad 134, the displayed time is stored in microcomputer 170 as the new time of day and continues to be updated. Also, DIGIT pads 132 may be used for many other functions such as inputting a cooking time period. The TIMER pad 136 is used as a count-down clock to an alarm for timing which may or may not be associated with the microwave oven. The RESET pad 138 is used to initialize microcomputer 170 thereby disregarding previous inputs or operation. READY TIME pad 140 is used to display the time of day that a stored program will start. When the READY TIME pad 140 is released, the time of day that the stored program will be completed is displayed. ACCU-TEMP pad 142 is used in combination with DIGIT pads 132 to input temperature data to microcomputer 170. COOK LEVEL pad 144 is used to alter the percent of power supplied by magnetron 14 to heating cavity 10. START pad 146 is used to commence a cooking cycle. STOP pad 148 is used to terminate a cooking cycle. As will be described in greater detail later herein, COOKING PROGRAM/REHEAT pad 150 is used to initiate a cook-by-weight operation. DISH WEIGHT pad 15 is generally used to enter the weight of the dish upon which the food is supported. FROZEN pad 154 generally defines a cooking operation which thaws the food from a frozen state and raises its temperature to refrigerator temperature, which, for example, may be approximately 40° F. COLD pad 156 is used to define a cooking operation that raises the temperature of the food from approximately refrigerator temperature to room temperature, which, for example, may be approximately 65° F. DONENESS pad 158 is generally used to select the desired doneness.

Figure 12A:
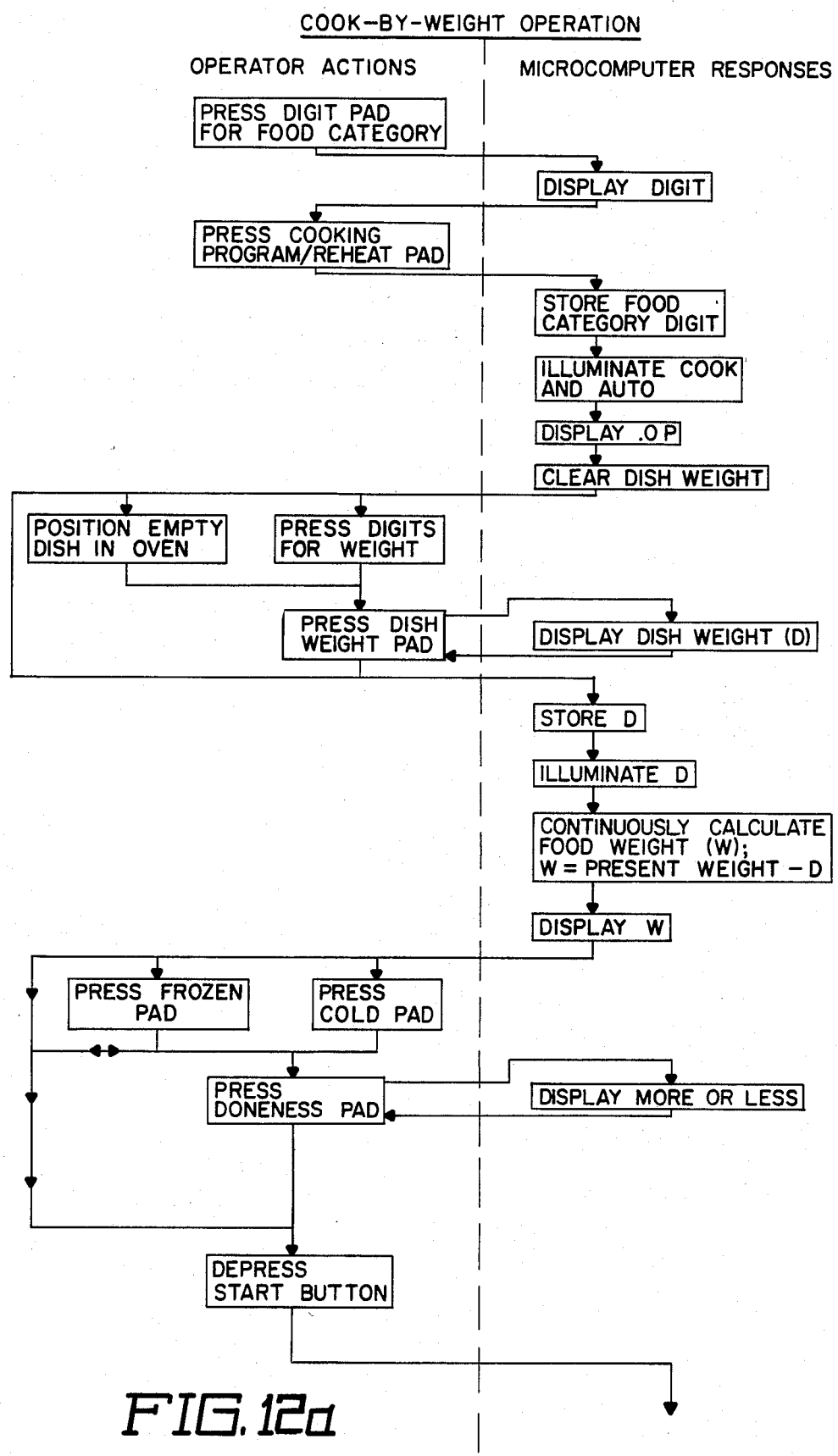
FIGS. 12a and 12b show a flow diagram of the operational mode of the microwave oven of FIG. 1.
Figure 12B:
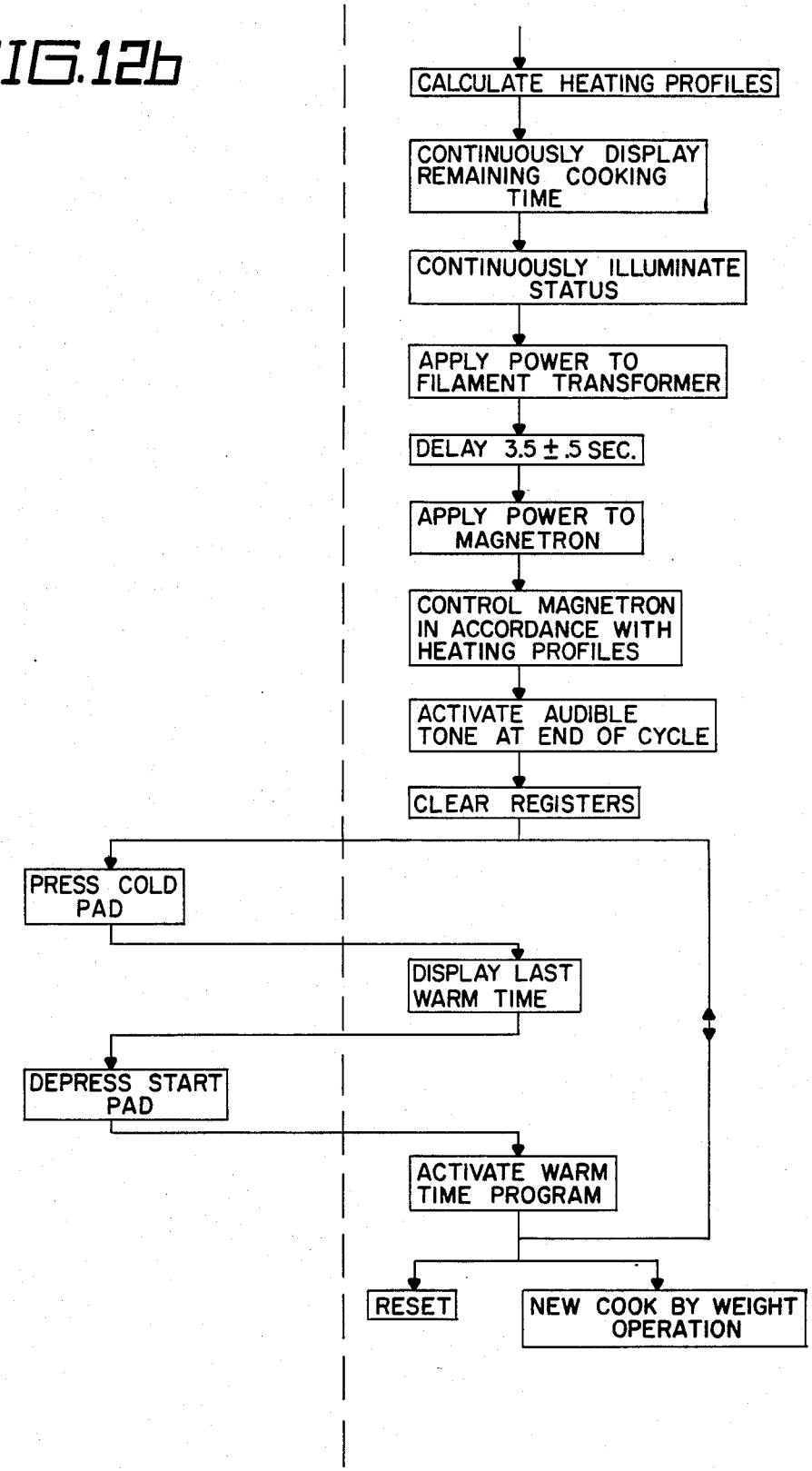

Referring to FIGS. 12a and 12b, there is shown a flow diagram for a cook-by-weight operation. Although a defrost cycle may be automatically included with a cooking operation when the initial state of the food is frozen, the operation of defrosting without cooking will be discussed later herein. The operator actions are indicated by the blocks on the left of the dashed center line and microcomputer 170 responses are indicated by the blocks on the right. Many conventional functions such as monitoring interlocks are not included in FIGS. 12a and 12b because they form no part of the invention; it is assumed they would be provided in a commercial oven. The programming of a computer or microcomputer 170 in accordance with FIGS. 12a and 12b and the discussion herein including omitted conventional functions is well known to those skilled in the art. First, the operator presses a numerical or DIGIT pad 132 corresponding to a food category. Preferably, these categories which are given in Table 1 below may be listed on control panel 40 for the convenience of the operator. In response to pressing a DIGIT pad 132, microcomputer 170 displays the digit in display 130 of the control panel 40. Next, the operator presse the COOKING PROGRAM/REHEAT pad 150 to indicate that a cook-by-weight operation is to be performed. In response to pressing of COOKING PROGRAM/REHEAT pad 150, microcomputer 170 stores the food category digit that is presently displayed. If there is more than one digit displayed, the least significant digit is accepted as the desired food category. If no food category had been entered, microcomputer 170 would default to a REHEAT operation which will be described in more detail later herein. Microcomputer 170 also illuminates the status word AUTO and displays .0P in display 130 to provide visual feedback to the operator. The computer also clears any resident dish weight from storage.

Next, the operator inputs the weight of the dish to be used for cooking; this can either be done manually or automatically using the scale 42 of the oven. In the automatic mode, the empty dish 47 is placed in the oven cavity 10 on the scale 42 and then the DISH WEIGHT pad 152 is pressed. In this process, the dish weight (D) is automatically stored in the microcomputer 170. In manual operation, the weight of the dish 47 is entered in display 130 by pressing the DIGIT pads 132. The pressing of the DISH WEIGHT pad 152 then enters and stores that displayed weight into the microcomputer 170. During that time when the DISH WEIGHT pad 152 is pressed, the microcomputer displays the dish weight on display 130. The least significant displayed digit is aP indicating pounds, while the other three digits starting with the most significant digit respectively, display tens of pounds, pounds, and tenths of pounds. Once the DISH WEIGHT pad 152 is released, microcomputer 170 stores the dish weight and illuminates the status word DISH WEIGHT in display 130 to provide visual feedback to the operator that a dish weight has been stored. The microcomputer 170 then continuously calculates the food weight (W) and displays it in the display 130. The food weight is calculated by subtracting the dish weight from the present weight on the scale 42. In other words, when the dish 47 is removed from the oven cavity 10 and then replaced therein with the food body 12 in it, the food weight is equal to the total weight less the weight of the dish 47. If the DISH WEIGHT pad 152 had not been pressed, the dish weight would be defaulted to zero. The highest weight accepted by microcomputer 170 is 20 pounds. If a larger weight is input, it is assumed that there is an error and the microcomputer sounds an alarm.

Next, the operator provides an input relating to the initial state of the food body 12. The three possible input states are frozen, cold, and room temperature. Frozen is defined as frozen food at a temperature of 0°. Cold is defined as food at refrigerator temperature which may, for example, be approximately 40° F. Room temperature is defined as food at room temperature which may, for example, be approximately 65° F. The frozen and cold states are input by the operator by the respective FROZEN pad 154 and COLD pad 156. If the START pad 46 is pushed without pushing either the FROZEN pad 154 or COLD pad 156, room temperature is selected by default. Pressing the FROZEN pad 154 to indicate that the initial state is frozen automatically defines a defrost cycle as the first of three cycles to get the food to its final cooked state. Later herein, pressing the FROZEN pad 154 will be described with reference to just defrosting when the COOKING PROGRAM/REHEAT pad 150 has not been selected. The particular defrost cycle is activated as a function of the food category. Pressing the COLD pad 156 defines a warm cycle that elevates the temperature of the food from a refrigerator temperature to room temperature. In addition to being activated by pressing the COLD pad 156, the warm cycle is also automatically activated as the second cycle in a cook-by-weight operation when the FROZEN pad 154 is pressed. Even after the warm cycle is completed, the time calculated for the warm cycle is not cleared from storage unless the RESET pad 138 or COOKING PROGRAM/REHEAT pad 150 is pressed; the reason for this will be described later herein. If room temperature is selected by default as the initial state of the food by not pressing either the FROZEN pad 154 or COLD pad 156, only the cook cycle which is the last of the three cycles will be activated. The particular cook cycle heating profile is determined in accordance with the food category and weight. In summary, after pressing the COOKING PROGRAM/REHEAT pad 150, the initial state of the food is input as frozen, cold or room temperature. If it is frozen, the food is defrosted, warmed, and then cooked in three sequential cycles. If the food is cold, it is first warmed to room temperature and then cooked utilizing only the last two cycles. If it is already at room temperature, it just goes through the final of the three cycles which is cooking.

Before depressing the START pad 146, the final doneness can be selected using the DONENESS pad 158. More specifically, if the DONENESS pad 158 is not pressed at all, the default is that the food will be cooked to medium. If the DONENESS pad 158 is pressed once, LESS DONE will be illuminated in display 130 and the cooking time will be adjusted downwardly as described later herein. If the DONENESS pad 158 is pushed twice, DONE MORE will be illuminated and the cooking time will be adjusted upwardly so as to provide food that is well done. If the DONENESS pad 158 is pushed three times, the selected state will be back to medium doneness.

A simmer time can be optionally entered either before or after the START pad 146 has been depressed; if entered after, STOP pad 148 must be pressed first. The input is provided using the DIGIT pads 132 and the function of the simmer time is to provide 40 percent power for the amount of time in minutes and seconds that is entered.

Once the START pad 146 is depressed, the computer calculates the time periods for the cycles that have been specified by the selected initial state. In review, if the initial state of the food is frozen, it will go through sequential cycles for defrost, warm, cook and simmer. If the food is at refrigerator temperature, it will go through the cycles for warm, cook, and simmer. If neither the FROZEN pad 154 or COLD pad 156 have been pressed indicating the food is at room temperature, it will only go through the third cycle which is cook and simmer.

Table 1 below identifies the cook-by-weight parameters for all of the food categories.

the frozen state, equation P2 is used to defrost, equation P5 is used to warm to room temperature, and equation P7 is used to cook. These equations will be defined below. In the last column of Table 1, a power level factor (R) is given. This is the power level factor to be substituted into the respective equations for the respective food categories unless a power level factor is specified for a particular equation. It would also specify the power level used for the cycle defined by the equation. The equations defining the heating profiles for the defrost, warm, and cooking cycles as identified in Table 1 are given below:

$$P1 = T_1 + T_E$$
where $T_1 = 37(W + 0.1)RP$; $R = .125$;
and $T_E = T_1$
$$P2 = T_1 + T_2$$
where $T_1 = 60(W + 0.1)RP$; $R = .025$;
$T_2 = 60(W + 0.1)RP$; $R = .250$
$$P3 = 0$$
$$P4 = T_1 + T_2 + T_3$$
where $T_1 = 68(W + 0.1)RP$; $R = .025$
$T_2 = 56(W + 0.1)RP$; $R = .125$
$T_E = T_1 + T_2$
$$P5 = 25(W + 0.1)RP$$
$$P6 = R(\beta + 10D/W)(W + 0.1)P$$
$$P7 = T_1 + T_2$$
where $T_1 = R(100)(W + 0.1)P$; $R = .025$
and $T_2 = R(\beta + 10D/W)(W + 0.1)P$ where W is the food weight in pounds; D is the dish weight in pounds; $\beta$ is the number of heat units in BTU's per pound as defined by the food category and altered by the DONENESS pad 158; $T_1$ is a time period in minutes; $T_2$ is a time period in minutes; $T_E$ is a temperature equilibrium time period with no power; P is a power multiplier; and R is a power level factor.

The time required to thaw, warm, or cook a given

TABLE 1

| FOOD CATEGORY DIGIT | FOOD CATEGORY | DONENESS ($\beta$) | | | COOK PROFILE | COLD PROFILE | DEFROST PROFILE | POWER LEVEL FACTOR (R) |
|---|---|---|---|---|---|---|---|---|
| | | RARE | MEDIUM | WELL | | | | |
| 0 | Tender Meats | 45 | 85 | 125 | P7 | P5 | P2 | .083 |
| 1 | Leafy Vegetables | 130 | 155 | 180 | P6 | P5 | P3 | .025 |
| 2 | Frozen Head Vegetables | 180 | 205 | 230 | P6 | P5 | P3 | .025 |
| 3 | Potatoes | 230 | 255 | 280 | P6 | P5 | P3 | .025 |
| 4 | Cakes | 100 | 125 | 150 | P6 | P5 | P1 | .036 |
| 5 | Custard Dishes | 193 | 218 | 243 | P6 | P5 | P1 | .063 |
| 6 | Seafood | 95 | 120 | 145 | P6 | P5 | P1 | .025 |
| 7 | Casserole, Boil | 80 | 105 | 130 | P6 | P5 | P4 | .025 |
| 8 | Poultry | 225 | 250 | 275 | P6 | P5 | P2 | .025 |
| 9 | Roast | 255 | 280 | 305 | P7 | P5 | p2 | .125 |
| | Reheat | 55 | 80 | 105 | P6 | P5 | P2 | .025 |

The food category digits are listed down the left-hand column. The digit for a particular food category is entered from the control panel 40 by the operator. The food category descriptions are identified in the second column of Table 1. In the doneness ($\beta$) columns, the heat units in BTU's per pound are listed for rare, medium, and well done. It is noted that except for the tender meats category, the rare and well doneness columns differ from the medium column by 25 heat units. In the defrost, cold, and cook profile columns, profile numbers between P1-P7 are listed. These profile numbers identify the profile equation used for the various cycles for the various food categories. As an example, for the tender meats category, if the meat starts out in food body in a microwave oven is a function of the output power of the magnetron. Accordingly, to precisely control the heating time in accordance with the weight of a given food body, the output power of the magnetron must either be regulated to a known value or a compensation factor entered for what it is known to be. The P is a power multiplier used to compensate for different ovens having different output powers. As an example, the ovens can be tested for power output during manufacturing and then, as described later herein, a P may be stored in microcomputer 170 according to Table 2 below to adjust the processing time to compensate for the output power being different than a standard of 700 watts.

TABLE 2

| Power Output | Multiplier, P |
|---|---|
| 650 | 1.08 |
| 675 | 1.04 |
| 700 | 1.00 |
| 725 | 0.96 |
| 750 | 0.93 |
| 775 | 0.90 |
| 800 | 0.87 |
| 825 | 0.84 |
| 850 | 0.82 |
| 900 | 0.77 |
| 925 | 0.75 |
| 950 | 0.73 |
| 975 | 0.71 |
| 1000 | 0.70 |

R is a power level factor specified for a particular profile equation. If no R is specified for a particular profile equation, the power level factor R as specified in Table 1 for that food category is used in the calculation of the profile equation. The power level factor R corresponds to cooking power levels as specified in Table 3 below. Similar to the P value, it may be programmed or stored in microcomputer 170 after manufacture for each category and for those defined with a particular equation.

TABLE 3

| Power Level Factor, R | Cook Level | Percent On Time |
|---|---|---|
| .250 | 1 | 10 |
| .125 | 2 | 20 |
| .083 | 3 | 30 |
| .063 | 4 | 40 |
| .050 | 5 | 50 |
| .042 | 6 | 60 |
| .036 | 7 | 70 |
| .031 | 8 | 80 |
| .028 | 9 | 90 |
| .025 | 0 | 100 |

The profile equations for defrosting are P1–P4. From Table 1, it can be seen that food categories 4–6 use profile equation P1 to defrost. Accordingly, for an oven programmed as having 700 watts output, these categories would be defrosted at 20 percent power (20 percent on-time) for 4.625(W+0.1) minutes and then permitted to sit without power for an equal time period.

From Table 1, it can be seen that food categories 0, 8, 9, and REHEAT use profile equation P2 to defrost. Accordingly, for an oven programmed as having 700 watts output, these food categories would have a defrost cycle consisting of a first time period of 1.5(W+0.1) minutes at 100 percent power and then a second time period of 15(W+0.1) minutes at 10 percent power.

From Table 1, it can be seen that food categories 1–3 do not have a defrost cycle.

From Table 1, it can be seen that food category 7 uses profile equation P4 to defrost. Accordingly, for this food category, the defrost cycle would consist of three time periods. For an oven programmed as having 700 watts output, the first time period would be 1.7(W+0.1) minutes at 100 percent power. The second time period would be 7(W+0.1) minutes at 20 percent power. The third time period would be equivalent to the sum of the first two time periods and, during this time period, no power would be supplied. The third time period is an equilibrium time period wherein heat equalizes in the food body by conduction. The fact that no power is being applied during the third time period is not discernable to the operator because, even though no power is applied, the display 130 continues to count down and the magnetron blower motor (not shown) continues running.

Figure 13:
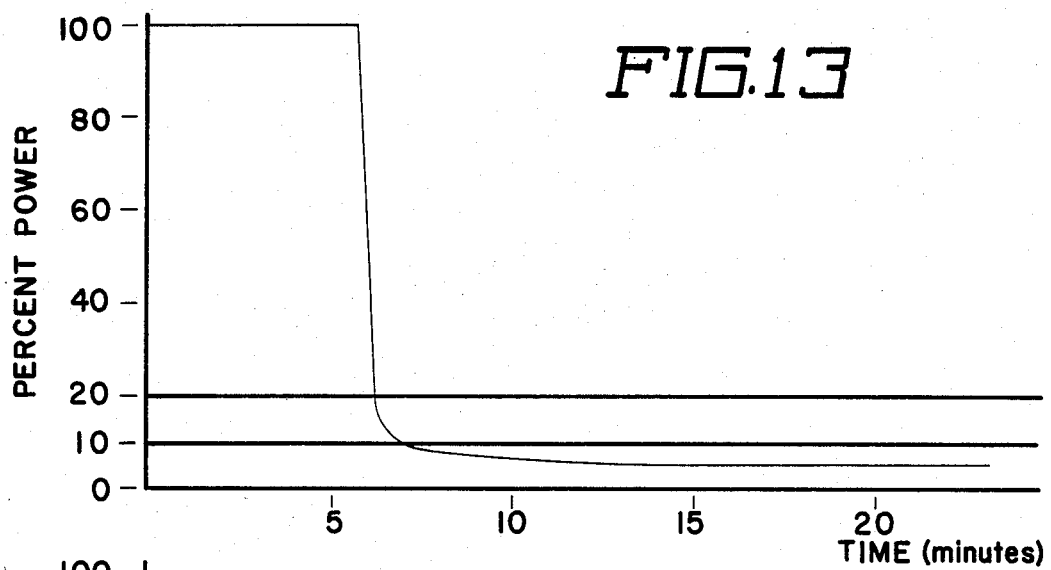
FIG. 13 is a time plot of microwave power used to defrost a roast without raising the surface temperature above 110° F.

Referring to FIG. 13, there is shown a plot of the maximum power versus time that could be applied to a 4-pound 6.5 ounce beef roast without raising the surface temperature above 110° F. The power is expressed in percent of a nominal value, such as, for example, 700 watts. The temperature was measured using a temperature probe on the surface of the roast with the control circuit set to not exceed 110° F. The temperature of 110° F. was selected because above that temperature, the surface of the food would begin to cook before the interior of the food is thawed. It is noted that once a portion of the food is thawed, most of the available microwave energy is absorbed by it rather than penetrating to the portions that are still frozen. Accordingly, reduced power is utilized to provide heat to the thawed portion and the interior is primarily defrosted by thermal conduction from the surface rather than by microwave absorption. More specifically, it can be seen that 100 percent power was applied for a first time period (approximately 0–5 minutes) until the surface of the food thawed and rose to 110° F. Then, the control circuit drastically reduced the power level to hold the surface at 110° F. During the second time period commencing at the power reduction, only enough power was supplied to maintain the surface at 110° F. while some heat radiated therefrom and some heat conducted inwardly to the food. Most of the defrosting of the interior of the food resulted from inward conduction of heat rather than by direct absorption of microwave energy. From the tests, it was found that there was a rather steep drop in the percent power required to maintain the surface at 110° F. once it reached 110° F. Accordingly, the desired defrost profile could be reasonably approximated by two sequentially stair-stepped power levels.

Figure 14:
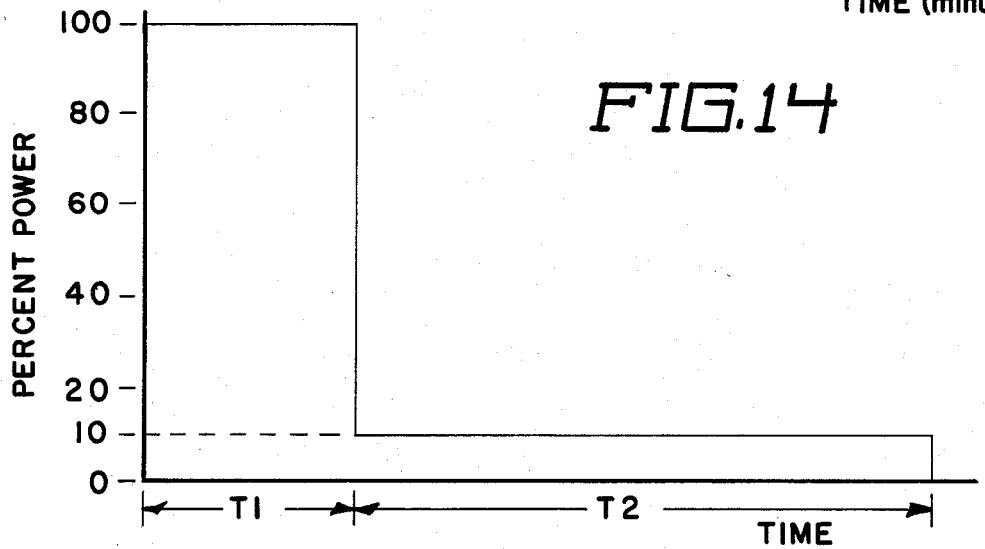
FIG. 14 is a percent power versus time plot of profile equation P2.
Figure 15:
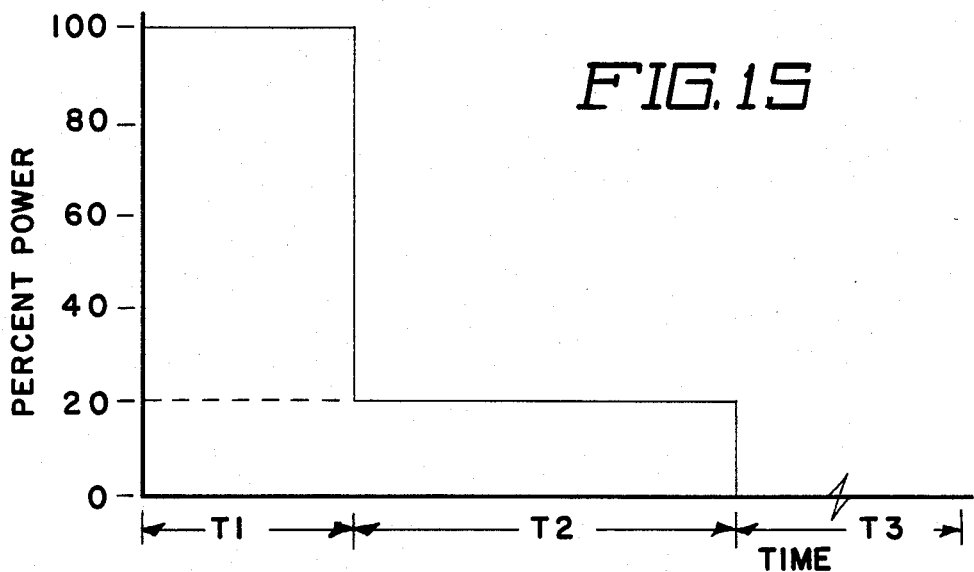
FIG. 15 is a percent power versus time plot of profile equation P4.

Referring to FIGS. 14 and 15, respective plots of the defrost profile equations P2 and P4 are shown. These profiles approximate the empirical data of FIG. 13 and are determined as a function of food weight and food category. More specifically, for profile equation P2 as shown in FIG. 14, T1 is equal to 1.5(W+0.1) minutes or slightly longer than 1.5 minutes per pound when the oven is programmed as 700 watts (P=1) and the weight of the food is on the order of one pound or more. T2 in FIG. 14 is ten times as long as T1 and the output power is 10 percent. The sum of the powers during T1 and T2 of profile equation P2 may preferably be equivalent to approximately 100 BTU's per pound. As is well known, 700 watts is approximately equal to 39.8 BTU's per minute. For profile equation P4 as shown in FIG. 15, T1 is equal to 1.7 (W+0.1) minutes so it is approximately 13 percent longer than the T1 of profile equation P2. T2 of profile equation P4 is 0.7(W+0.1) minutes and is at 20 percent power. The sum of the powers during T1 and T2 of profile equation P4 may also preferably be approximately 100 BTU's per pound. While the power of 10 percent for T2 of equation P2 holds the surface temperature at approximately 110° F. to prevent surface cooking, the 20 percent power of T2 of equation P4 permits the surface temperature to rise above 110° F. This is acceptable, however, because equation P4 is only used for the casserole food category and they are generally cooked before they are frozen. The balance is to thaw the food as fast as possible without adversely affecting the appearance and palatability. With meat, for example, it is important that the thawed product appear like fresh meat.

Referring again to Table 1, it can be seen that the cold profile equation is the same for all food categories. Once again, the cold profile equation is used to raise the temperature of the food from a refrigerator temperature, such as, 40° F. to room temperature which may be 65° F.

From Table 1, it can be seen that all food categories except for 0 and 9 use profile equation P6 for cooking. The $\beta$ is defined in Table 1 and expresses the heat units in BTU's per pound that are required to cook the particular food category. It is noted that if the DONENESS pad 158 has been pressed either once or twice, fewer or more heat units are respectively subtracted from or added to the medium $\beta$ value for that particular food category. Using food category 9 as an example, if roast is to be done medium, 280 BTU's per pound are provided during the cooking cycle. If, the DONENESS pad 158 is pressed once to indicate that the roast is to be done rare, 25 BTU's per pound are subtracted from the medium value leaving 255 BTU's per pound during cooking. Also, if the DONENESS pad 158 is pressed twice indicating the roast is to be well done, 25 more or 305 BTU's per pound are provided during the cooking cycle. One of ordinary skill in the art will recognize that the three $\beta$ values for each food category could be obtained by storing all three values or by storing one and either adding or subtracting the appropriate number of heat units to get the other two. If the food weight W is large with respect to dish weight D, the term 10D/W becomes insignificant compared to the value of $\beta$. As dish weight D becomes large with respect to the food weight W, the 10D/W term takes on more significance and is used to compensate for the losses to the dish. More specifically, because some of the heat from the food transfers to the dish by conduction, the term 10D/W compensates for those heat losses by expressing the dish in terms of equivalent food weight. For profile equation P6, as 10D/W becomes equal to or greater than 100, microcomputer 170 sets the term equal to 100.

From Table 1, it can be seen that food categories 0 and 9 use profile equation P7 for cooking. For these categories, the food is cooked at 100 percent power for a first time period and then is reduced in power for a second time period. As with profile equation P6, if 10D/W is equal to or greater than 100, then the term is equal to 100.

After the time periods for the respective heating profiles for defrost, warm and cook are calculated for the particular food category and weight, the computer controls the operation of the microwave oven and, in particular, it controls the magnetron in accordance with well-known practice. More specifically, the computer applies filament transformer power for 3.5 seconds ±0.5 seconds and then applies high voltage to the magnetron according to the power level and time period as specified by the particular profile equation. The cycle is illuminated on display 130 as a visual indication to the operator of the current status of the oven. Also, the total time remaining to complete all specified cycles is output digitally on display 130. When all of the specified cycles have been completed bringing the food to a cooked state, the computer activates an audible tone to indicate termination of the cook-by-weight task. Then, the cycle times except the time to warm from refrigerator temperature to room temperature are cleared from microcomputer 170. After inspecting the food, if the operator wishes to provide some more cooking, the COLD pad 156 and the START pad 146 are sequentially pressed. In response to this action, microcomputer 170 displays the last warm time calculated and then activates that warm time program. More specifically, microcomputer 170 controls the oven in accordance with profile equation P5 which provides enough microwave energy to raise that particular food type from refrigerator temperature to room temperature. This is an important feature because it provides an incremental temperature boost which is determined by the weight of the food rather than an arbitrary operator time setting. The warm profile may be continuously repeated by pressing the COLD pad 156 and START pad 146 until microcomputer 170 is either reset or until a new cook-by-weight operation is initiated.

Heretofore, the operation of the oven has been described with reference to obtaining a final state of cooked food regardless of whether the initial state was frozen, cold, or room temperature. Microcomputer 170 can also be used to control the oven automatically when the objective is to reheat food that has already been cooked or to defrost food without cooking it. For reheating food, the COOKING PROGRAM/REHEAT pad 150 is pressed without first pressing a DIGIT pad 132 to enter a food category. Stated differently, microcomputer 170 defaults to reheating without cooking when no food category is selected. In such case, AUTO is illuminated in display 130 and the absence of a displayed food category digit indicates that the REHEAT function has been selected. It is noted that depending on the doneness selection, $\beta$ is equal to either 55, 80, or 105 BTU's per pound in the reheat operation regardless of the food category; these are substantially fewer BTU's per pound than required to cook. To initiate an automatic defrost cycle without cooking, the operator presses a DIGIT pad 132 corresponding to a food category and then presses the FROZEN pad 154. After the dish weight is entered in a similar manner to that described with reference to FIG. 12a, START pad 146 is pressed and the food is defrosted according to the defrost cycle described with reference to FIG. 12a.

Figure 16:
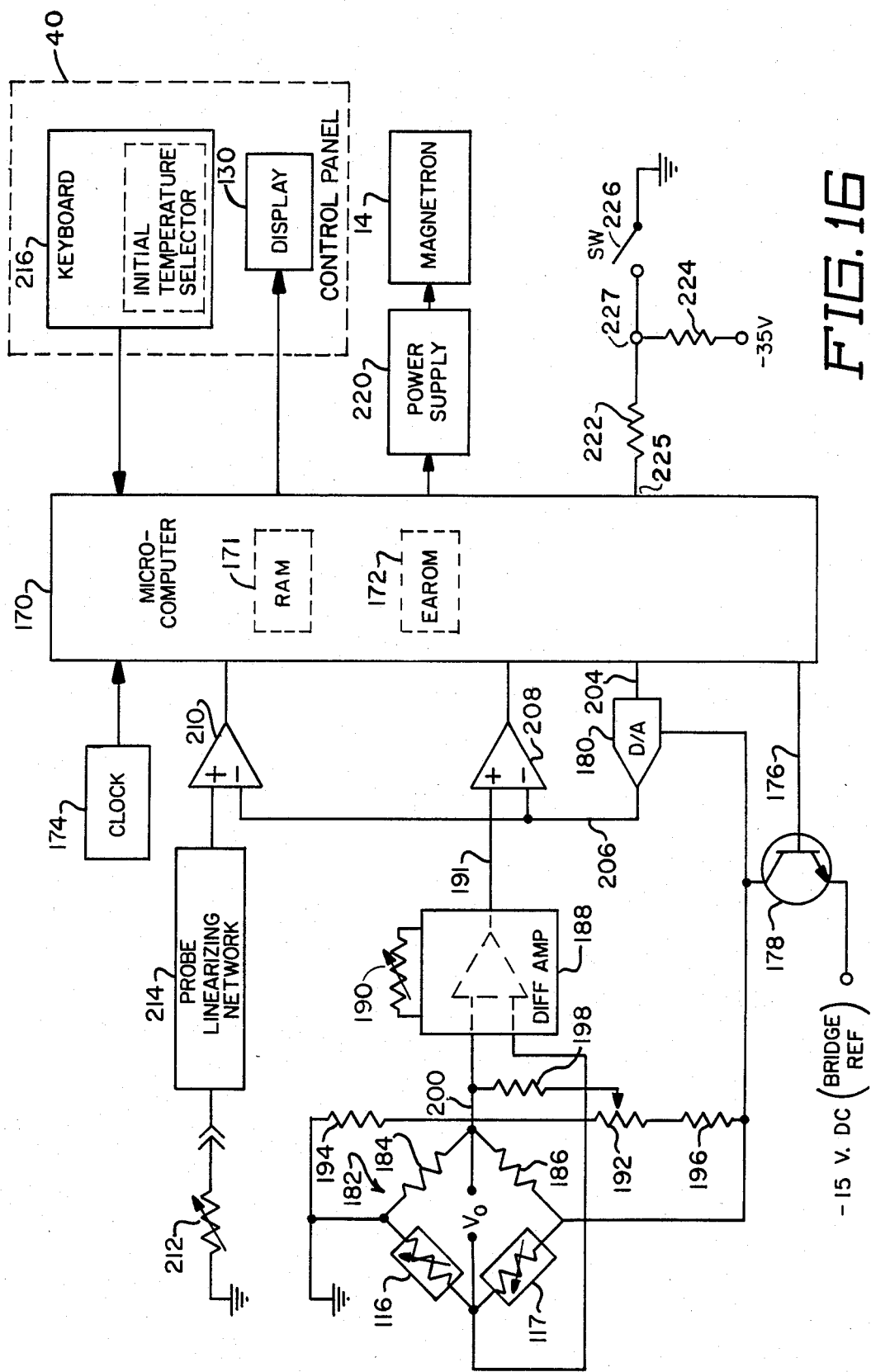
FIG. 16 is a schematic diagram of the control circuit for the microwave oven of FIG. 1.

Referring to FIG. 16, there is shown a schematic diagram of the control circuit of the microwave oven; some of the conventional parts are shown as diagrammatical blocks. Microcomputer 170 includes a customized integrated circuit that is designed to perform the functions described herein. The process of designing the integrated circuit and the programming of it to perform the functions as described are well known to those skilled in the art. It is recognized that these functions could be performed by a general purpose microprocessor such as described in U.S. Pat. No. 4,390,768 which has already been incorporated by reference, but that it is more commercially advantageous to use a customized integrated circuit with many interface functions included therein. Microcomputer 170 also includes a random access memory (RAM) 171 which stores operational data entered through control panel 40 by the operator and an electronically alterable read-only memory (EAROM) 172 which stores computational constants used in calculating time periods.

A reference clock 174 is provided for microcomputer 170. Conventionally, clock 174 may consist of an AC filter connected to the 60 hertz AC power line and a zero crossing detector, the output of which is coupled to the microcomputer 170.

In operation, microcomputer 170 continuously provides scale strobes on line 176 at a high rate such as, for example, one every 50-100 milliseconds. These scale strobes are used to bias transistor 178 which functions as a switch to provide $-15$ volts DC across wheatstone bridge 182 and activates 9-bit digital to analog converter 180. Two of the legs of bridge 182 consist of strain gauges 116 and 117 as shown in FIG. 8 and the other two legs consist of resistors 184 and 186 which are equal and may, for example, be 357 ohms. Bridge 182 is a conventional strain gauge circuit and, as is well known, it is balanced when the resistance of strain gauge 116 equals the resistance of strain gauge 117. Under this balanced condition, $V_0$ will be zero when the $-15$ volt DC reference voltage is applied. Except as will be described later herein with respect to zero offset adjust, $V_0$ is determined by bridge 182 and is applied to precision differential amplifier 188. Accordingly, when there is no weight exerted on compliant member 102, such that beam 112 is not under stress, $V_0$ would be approximately zero because the resistances of strain gauges 116 and 117 will be approximately equal. As weight is applied to compliant member 102 such that beam 112 bends, strain gauge 116 is put in tension and strain gauge 117 is put in compression such that their resistances vary according to well-known principles. The result is that bridge 182 becomes unbalanced and $V_0$ takes on a value other than zero. By using two strain gauges instead of one, the output is doubled and the accuracy is increased. By using the S-shaped compliant member 102 as described earlier, both strain gauges 116 and 117 can be put on the same side of beam 112 with one in compression and the other in tension. As an illustration, it may be preferable that the components of the scale 42 be such that $V_0$ is approximately 30 millivolts when 20 pounds is placed on tray 46 and that $V_0$ vary linearly with the applied weight down to a $V_0$ value of zero when the weight is zero. For example, for this illustration, a weight of 5 pounds would result in $V_0$ being 7.5 millivolts and a weight of 10 pounds would result in $V_0$ being 15 millivolts. Differential amplifier 188 may preferably have a gain of approximately 325 such that there is an initial factory adjustment of gain adjust resistor 190 to provide a voltage of 9.75 volts on line 191 when tray 46 supports 20 pounds of weight. Zero offset adjust resistor 192, which is connected between resistors 194 and 196 may be used to adjust the mechanical zero to the software of microcomputer 170 so that the microcomputer operates in a preferred range. More specifically, this is an adjustment that may preferably be made once at the factory during fabrication to compensate for the particular mechanical characteristics of an individual microwave oven. It is not an adjustment that should be made by the user. The calibration of scale 42 will be described later herein. The tap of resistor 192 is connected through resistor 198 to line 200 to provide an adjustment to $V_0$. Typical values for resistors 192, 194, 196, and 198 may be 10 K, 11.5 K, 15.8 K and 27 K ohms, respectively.

In operation, a voltage is provided on line 191 which voltage is proportional to the strain on beam 112 which is proportional to the weight positioned on tray 46. This voltage on line 191 is generated in response to a scale strobe on line 176 which also activates 9-bit digital to analog converter 180 to accept a sequence of digital values on lines 204 from microcomputer 170 to provide analog voltages on line 206. The voltages on line 191 and 206 are compared in comparator 208 providing microcomputer 170 with an indication of the weight on scale 42. The digital values from microcomputer 170 to converter 180 may be provided with various formats such as, for example, an increasing scan, a decreasing scan, or an incremental scan followed by a vernier adjust. The analog signal on line 206 is also provided to comparator 210 to sense the temperature of food temperature probe 212 which varies in resistance with temperature as coupled through conventional probe linearizing network 214.

Keyboard 216, display 130, power supply 220, and magnetron 14 are shown in diagrammatical blocks because they define conventional apparatus such as described in U.S. Pat. No. 4,390,768, which has already been incorporated by reference.

Still referring to FIG. 16, the position of switch 226 controls the mode of microcomputer 170 by providing a mode determining signal to port 225. With switch 226 open as shown, $-35$ volts is connected through resistors 224 and 222 to port 225. Resistors 222 and 224 may, for example, be 100 K ohms and 27 K ohms, respectively. The voltage so provided puts microcomputer 170 in an operational mode as described heretofore with reference to FIGS. 11 and 12a and 12b. More specifically, in the operational mode, the operator may enter control data through keyboard touch pads 132-158, and this control data may be stored in a volatile memory such as RAM 171 where it is operated on by the operational program to control the microwave oven. Switch 226, which may be a wire that is connected by a technician or serviceman from test pin 227 to ground, clamps port 225 to ground. This grounding provides a mode determining signal to microcomputer 170 which puts it in a mode used for calibrating scale 42 or altering computational constants. The computational constants are stored in a nonvolatile memory such as EAROM 172 so that they will not be erased if AC power to the microwave oven is interrupted. Example of these computational constants are the values for $\beta$ and R as listed in Tables 1 and 3 and specified in equations P1-P7, and a value for P as listed in Table 2. Another example is a constant used to compensate for the microwave cooking time difference between operating at 50 cycles and 60 cycles.

The mode for calibrating scale 42 or altering computational constants may typically be used at the factory or in the field by qualified servicemen. Generally, this mode would not be available to the user. To enter this mode, the technician grounds test pin 227. Once in this mode, control panel 40 takes on different functions than in the operation mode. For example, the pressing of a particular DIGIT pad 132 such as digit 1 enters a software subroutine for altering $\beta$, P, R, and the AC power rate constant. The new values for the computational constants are entered using DIGIT pads 132 and other pads of keyboard 216 are used to sequence through the accessed storage locations of EAROM 172. For example, to enter the programming or computational constant updating mode, the serviceman may sequentially push RESET pad 138, DIGIT pad 132 for digit 1, and START pad 146 after closing switch 226. Then, ACCUTEMP pad 142 may be sequentially pressed through the $\beta$ and R values to get to P which is the computational constant requiring altering. This illustrative example could be used to compensate for the measured output power being different than a standard or reference power of 700 watts. More specifically, if the power is measured to be 775 watts, 0.90 (see Table 2) would be entered as a computational constant for P through DIGIT pads 132. This constant would reduce the calculated time periods.

As an alternative, if DIGIT pad 132 for digit 2 had been pressed, rather than digit 1 following RESET pad 138, calibration of scale 42 could be performed. As an illustration, a weight of 12 pounds could be placed on scale 42 and the zero adjust resistor 192 would be adjusted to provide a read-out on display 130 in the range from 11.95 to 12.05. Then, the weight is taken off and the gain adjust resistor 190 is adjusted for a display reading between 9995 and 0005. Although resistors 192 and 190 could be adjusted in the operational mode rather than entering the calibrating subroutine, greater accuracy is provided using the scale calibration mode. The pressing of RESET pad 138 at any time provides initialization and access back and forth between scale calibrating and computational constant updating.

This concludes the description of the preferred embodiment. The reading of it by one of skill in the art will bring to mind many alterations and modifications without departing from the spirit and scope of the invention. Accordingly, it is intended that the scope of the invention be limited only by the appended claims.

What is claimed is:

1. In a microcomputer controlled microwave oven having a scale coupled to the cavity thereof, the method of using the microcomputer to control the microwave oven comprising the steps of:
   positioning a food body in said cavity of said microwave oven;
   providing a first signal from said scale to said microcomputer, said first signal corresponding to the weight W of said food body positioned in said cavity;
   inputting a second signal to said microcomputer, said second signal specifying the food category of said food body as selected by the operator;
   calculating a first time period in response to said first signal, said first time period defining the time of microwave radiation to raise the temperature of said food body from an initial state of approximately refrigerator temperature to a final state of approximately room temperature;
   calculating a second time period in response to said first and second signals, said second time period defining the time of microwave radiation to cook said food body from an initial state of approximately room temperature;
   controlling said microwave oven through sequential steps of microwave radiation in accordance with said first and second time periods, respectively; and
   controlling said microwave oven through a sequential step of microwave radiation in accordance with said first time period of a second occurrence, said second occurrence following said step of said second time period and being in response to an operator actuated input.

2. The method recited in claim 1 wherein said refrigerator temperature is approximately 40° F.

3. The method recited in claim 1 wherein said room temperature is approximately 65° F.

4. The method recited in claim 1 wherein said first time period is calculated by the equation $$T_1 = 25(W+0.1)RP$$

where R compensates for the oven output power being less than maximum and P compensates for the maximum output power of the oven being different than a predetermined standard output power.

5. In a microcomputer controlled microwave oven having a scale coupled to the cavity thereof, the method of using the microcomputer to control the microwave oven comprising the sequential steps of:
   positioning a food body in said cavity of said microwave oven;
   storing a food category in said microcomputer in response to a first operator actuated control signal, said food category being selected by said operator;
   storing the food weight W of said food body in said microcomputer in response to a second operator actuated control signal, said food weight W being derived from a weighing of said scale that is coupled to said microcomputer;
   calculating in said microcomputer a first time period corresponding to the microwave radiation time required to raise the temperature of said food body from a refrigerator temperature to room temperature, said first time period being calculated as a function of said food weight W;
   calculating in said microcomputer a second time period corresponding to the microwave radiation time required to cook said food body from an inital state of room temperature, said second time period being calculated as a function of said food weight W and said food category; and
   controlling the microwave radiation of said microwave oven through three sequential steps, the first step being equal to said first time period, the second step being equal to said second time period, and the third step being in response to an operator actuated control and being equal to said first time period.

6. The method recited in claim 5 wherein said refrigerator temperature is approximately 40° F.

7. The method recited in claim 5 wherein said room temperature is approximately 65° F.

8. The method recited in claim 5 wherein said first time period is calculated by the equation $$t_1 = 25(W+0.1)RP$$

where R compensates for the oven output power being less than maximum and P compensates for the maximum output power of the oven being different than a predetermined standard output power.

* * * * *